P. E. DEMMLER.
THERMOSTAT.
APPLICATION FILED NOV. 13, 1919.
1,406,352.
Patented Feb. 14, 1922.
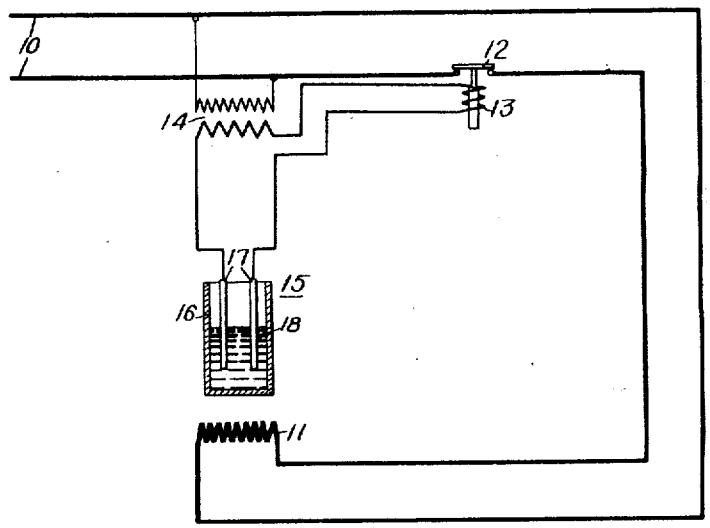
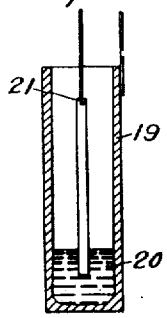
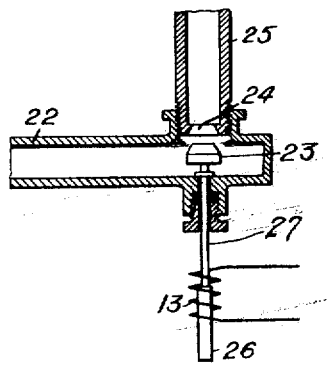
WITNESSES:
INVENTOR
Paul E. Demmler.
BY
ATTORNEY

UNITED STATES PATENT OFFICE.

PAUL E. DEMMLER, OF PITTSBURGH, PENNSYLVANIA, ASSIGNOR TO WESTINGHOUSE ELECTRIC & MANUFACTURING COMPANY, A CORPORATION OF PENNSYLVANIA.

THERMOSTAT.

1,406,352.   Specification of Letters Patent.   Patented Feb. 14, 1922.

Application filed November 13, 1919. Serial No. 337,679.

*To all whom it may concern:*

Be it known that I, PAUL E. DEMMLER, a citizen of the United States, and a resident of Pittsburgh, in the county of Allegheny and State of Pennsylvania, have invented a new and useful Improvement in Thermostats, of which the following is a specification.

My invention relates to electrical protective devices and particularly to thermostats for actuating such devices.

One object of my invention is to provide a thermostat which shall operate at various predetermined points over a wide range of temperatures.

Another object of my invention is to provide a relatively simple and inexpensive thermostat which will not readily get out of order and which will regulate within relatively narrow limits of temperature range.

Heretofore, thermostats have been made which depended upon the expansion of a metal, or the differential expansion of different metals, as, for example, a bi-metallic strip. Such thermostats cannot be used above 150° C. and, even at lower temperatures, may soon indicate fatigue and lose their accuracy. Thermostats for higher temperatures, depending upon a gas or liquid thermometer or thermo-electric pyrometer to operate a relay for opening and closing the heating circuit, are expensive, delicate and liable to get out of order.

In practising my invention, I provide electrically-actuated means for controlling the amount of heat supplied to a heated substance, and I control the electric means by a variable-resistance element which may comprise a suitable container, electrodes located therein and an electrolyte, the resistance of which is relatively high below a predetermined temperature and which decreases with an increase of temperature. The resistance element may also consist of a rod, or other suitable shape of the resistance material, or of a rod or other suitable shape of an inert porous material impregnated with the resistance material and provided with suitable leads. The decrease in resistance, with increase of temperature, is relatively rapid at first over a given range of temperature and practically reaches its minimum at or near the fusing point of the particular material used as electrolyte. The increased conductivity of the electrolyte, at a predetermined temperature, permits a current to traverse the winding of the actuating coil of the switch which is strong enough to open the switch and thus interrupt the current through the heating resistor. As the temperature falls, after interrupting the heating current, the conductivity of the electrolyte decreases until the coil can no longer hold the switch open. The heating circuit is then closed, and the operations outlined above are repeated.

Referring to the single sheet of drawings, Figure 1 is a vertical cross-sectional view of the resistance element embodying my invention and of a diagram of connections of the circuits employed therewith. Fig. 2 is a vertical cross-section of a modified form of the resistance cell embodying my invention, and Fig. 3 is a view—partly in section—of a valve which may be used, with the device embodying my invention, to regulate the amount of heat supplied by a gas burner.

A supply circuit 10, which is here shown as an alternating-current circuit, energizes a resistor 11 which may be of any suitable or desired construction and which may be used to heat any desired substance. The flow of current from the supply circuit 10 through the resistor 11 is controlled by means of an electromagnetic switch 12 which may be of usual construction and which is operable to close the circuit through the resistor when the current in the actuating coil 13 is below a predetermined value and which is operable to open the circuit through the resistor when the current traversing the coil 13 is above a predetermined value. A suitable potential transformer 14 is operatively connected to the conductors of the supply circuit 10 and provides an alternating electromotive force of relatively low voltage.

A resistance cell 15 is located in the substance being heated in proximity to the resistor 11 and comprises a relatively small container 16 which may be of glass, quartz or other material, and may be shaped like a test tube, although the container may take other forms. A plurality of electrodes 17, which may be of some suitable material, such as silver, are held in spaced relation in the container 16. An electrolyte 18, which is located in the container 16, may consist of any one of a relatively large number of different materials or mixtures of materials. I may use any one of numerous salts, such as silver chloride or potassium nitrate, or I may use any one of a number of different sulphides, oxides, or silicates, or carborundum or porcelain, the main considerations being that the material used as an electrolyte or resistance element shall have a negative temperature co-efficient of resistance and shall have a relatively large range in resistance between certain narrow temperature limits. Different materials will have this large range of resistance at different temperatures so that, by selecting the electrolyte or resistance element, we may control the temperature of the substance being heated, or the temperature in the neighborhood of the resistance 11, at any given or desired value. Thus, when controlling the temperature of an electrically-heated solder pot, we may use potassium nitrate as an electrolyte in the resistance cell and thereby be able to control the temperature within a range of approximately 20° to about 340°. By the use of my invention, I am able to control the temperature at various points up to 600° C. within approximately 20° by the use of various salts. By the use of other materials, such as a proper sulphide, oxide, or silicate, or carborundum, or porcelain, I am able to control temperatures within slightly wider limits up to 1000° C. or even somewhat higher.

Fig. 2 shows a modification of the container for the resistance cell embodying my invention. A metal tube 19, closed at its lower end, serves as one electrode and also contains the electrolyte 20 and a single electrode 21 held in spaced relation therein.

In Fig. 3, a pipe 22, connected to a gas supply, (not shown) is provided with a valve 23 which co-operates with a seat 24 to decrease the amount of gas supplied to a gas burner (not shown) through a pipe 25. A magnetizable core member 26 is connected to the valve by means of a rod 27, and an actuating coil 13 is provided to operate the valve. When the current in the actuating coil becomes large enough to cause the core 26 to move, the valve 23 is moved toward the seat 24 to reduce the amount of gas supplied to the burner. When the current in the coil decreases again the valve will again open and permit the normal amount of gas to be supplied to the burner.

The knowledge that many materials have relatively great variations of resistance with small changes of temperature has long been known in the arts, but, so far as I am aware at present, I am the first to use this property to control the temperature of a substance being heated. By selecting a suitable electrolyte or resistance material from a series of available materials, I am able to maintain and control temperatures within relatively narrow temperature limits at any one of a number of different points in the above described manner, and I desire to protect these ideas in this application. I desire, therefore, that only such limitations shall be placed upon my invention as are imposed by the prior art or are specifically set forth in the appended claims.

I claim as my invention:

1. In a temperature-regulating device, the combination with a source of heat and means for controlling said source of heat, of only a single resistor having a negative temperature coefficient operatively connected in circuit with said controlling means.

2. A temperature-regulating device comprising a control circuit containing a source of electromotive force and thermal-responsive means, normally non-conducting electrically but rendered conducting at a predetermined temperature, for controlling the energization of said control circuit.

3. In a temperature-regulating device, the combination with a source of heat and electric means for controlling said source of heat, of only a single resistor in thermal relation with said source of heat and operatively connected in circuit with said electric controlling means, the resistance of said resistor being inversely proportional to its temperature.

4. In a temperature-regulating device, the combination with a source of heat, electric means for controlling said source of heat, and a source of electromotive force, of only a single variable resistance cell in heat receiving relation to said source of heat and operatively connected in circuit with said source of electromotive force and said electric controlling means, the resistance of said cell being inversely proportional to the temperature thereof.

5. In a temperature-regulating device, the combination with a source of heat, electric means for controlling said source of heat, and a source of electromative force, of a thermally-responsive electrolyte thermally associated with said source of heat, and operatively connected in circuit with said source of electromotive force and said electric controlling means.

6. In a temperature-regulating device, the combination with a source of heat and electric means for controlling said source of heat, of a variable-resistance element in heat-receiving relation to said source of heat and operatively connected in circuit with said electric controlling means, said resistance element comprising a container and an electrolyte and an electrode in said container, the resistance of said electrolyte being inversely proportional to its temperature.

7. A temperature-regulating device for an electric heating circuit comprising an electrically actuated circuit interrupter, a source of constant electromotive force, and an electrolyte operatively connected in circuit with said source of electromotive force and the tripping coil of said interrupter that shall be operative, at a predetermined temperature, to ensure a sufficient current flow to cause said interrupter to open the circuit.

8. In an electric circuit, the combination with an energy-translating device, and a circuit interrupter having a tripping coil, of a source of electromotive force and an electrolytic cell operatively connected in circuit with said tripping coil and said source of electromotive force, said cell being heated in accordance with the temperature of the translating device to permit energy to be supplied to said tripping coil in accordance with the temperature of the translating device.

9. In an electric circuit, the combination with an energy-translating device, and a circuit interrupter having a tripping coil, of a source of electromotive force and a resistor operatively connected in circuit with said tripping coil and said source of electromotive force and in heat-receiving relation to said translating device to permit sufficient current to flow through said tripping coil to operate the circuit interrupter only when the temperature of the translating device reaches a predetermined value.

10. In a temperature-regulating device for an electric circuit containing an energy-translating device, the combination with a circuit interrupter having a tripping coil and a source of electromotive force, of a resistor in heat-receiving relation to said translating device and operatively connected in circuit with said tripping coil and said source of electromotive force, the resistance of said resistor being inversely proportional to its temperature.

11. A temperature-regulating device for an electric circuit containing an energy-translating device, a switch in said circuit, an electromagnet for controlling said switch, a circuit including said electromagnet, a source of electromotive force and a single thermally-responsive resistor thermally associated with said energy-translating device and operative, by an increase in temperature to a predetermined value, to actuate said electromagnet to open said switch.

12. In a temperature-regulating device for an electric circuit containing an energy-translating device, the combination with a switch in said circuit, and an electromagnet for controlling said switch, of a source of electromotive force and a variable-resistance cell disposed in heat-receiving relation to said translating device, said cell comprising a container, a fusible means and a plurality of spaced electrodes located therein for controlling the circuit of the electromagnet.

13. A protective device for an electric circuit containing an energy-translating device, a switch in said circuit, an electromagnet for controlling said switch, and a control circuit including said electromagnet, a source of electromotive force and a variable-resistance cell comprising a container, a plurality of electrodes located in spaced relation in said container, and means located in said container, in contact with said electrodes and responsive to an increase of temperature for permitting an increased current to flow in said control circuit.

14. A protective device for an electric circuit containing an energy-translating device, a switch in said circuit, a tripping coil for actuating said switch, and a control circuit including a source of electromotive force, said tripping coil and a variable resistance cell which comprises a container in heat-receiving relation to said translating device, a plurality of electrodes located in spaced relation in said container, and fusible material located in said container and surrounding said electrodes, said material fusing at a predetermined temperature and permitting an operative current to flow in said control circuit.

15. A protective device for an electric circuit containing an energy-translating device, a switch in said circuit, a tripping coil for actuating said switch, and a control circuit including a source of electromotive force, said tripping coil and a variable resistance cell which comprises a container in heat-receiving relation to said translating device, a plurality of electrodes located in spaced relation in said container, and thermally-actuated means located in said container, and surrounding said electrodes for precluding an operative current flowing in said circuit below a predetermined temperature and for permitting an operative current to flow therein at a predetermined temperature.

16. A protective device for an electric circuit containing an energy-translating device, a switch in said circuit, a tripping coil for said switch, and a control circuit including said tripping coil, a source of electromotive force and a single variable-resistance element in heat-receiving relation to said translating device, the resistance of said element being inversely proportional to the temperature thereof.

17. A protective device for an electric circuit containing an energy-translating device, a switch in said circuit, a tripping coil for said switch and a control circuit including said tripping coil, a source of electromotive force and a variable-resistance cell in heat-receiving relation to said translating device, said resistance cell comprising a container, a pair of electrodes in said container, and an electrolyte whose resistance is inversely proportional to the temperature thereof.

18. A protective device for an electric circuit containing an energy-translating device, a switch in said circuit, a tripping coil for said switch and a control circuit including said tripping coil, a source of electromotive force and a variable-resistance cell in heat-receiving relation to said translating device, said resistance cell comprising a metal container, an electrode in said container and an electrolyte the resistance of which is inversely proportional to the temperature thereof.

19. A variable-resistance cell comprising means normally non-conducting at temperatures below a predetermined temperature.

20. A variable-resistance cell comprising an electrolyte, the resistance of which varies in inverse ratio to the temperature thereof.

21. A thermostat comprising a fusible electrolyte and means for inserting the same in an electric circuit.

22. A thermostat comprising an electrolyte fusible at a predetermined temperature, an electrode and conducting means whereby the thermostat may be connected in an electric circuit.

23. A thermostat comprising an electrolyte relatively non-conducting below a predetermined temperature and an electrode disposed in the electrolyte.

24. A thermostat comprising an electrolyte having a negative temperature-resistance coefficient and means for connecting the electrolyte in an electric circuit.

25. An electrical thermostat comprising means relatively stationary, one of which is relatively non-conducting at normal temperatures but which becomes relatively conducting at or above a predetermined temperature.

26. A thermal control device comprising a material normally non-conducting electrically at ordinary temperatures but rendered conducting at predetermined temperatures.

27. A thermal control device comprising a material relatively non-conducting electrically at relatively low temperatures but rendered conducting at relatively high temperatures.

28. A thermal control device for an electric circuit comprising a material normally non-conducting at relatively low temperatures but rendered relatively conducting at or above a predetermined temperature and means for connecting the material in the circuit.

29. The method of controlling the temperature of a heat-storage device which consists in heating, in accordance with the temperature of the device, a substance which is normally electrically non-conducting but which becomes conducting at a predetermined temperature, and then controlling the supply of heat to the device in accordance with the electrical conductivity of the heated substance.

In testimony whereof, I have hereunto subscribed my name this 30th day of Oct., 1919.

PAUL E. DEMMLER.